United States Patent [19]

Okamura et al.

[11] Patent Number: 5,004,180
[45] Date of Patent: Apr. 2, 1991

[54] MAGNETIC TAPE CASSETTE

[75] Inventors: Masatoshi Okamura; Takashi Namioka; Haruo Shiba, all of Nagano, Japan

[73] Assignee: TDK Corporation, Japan

[21] Appl. No.: 558,779

[22] Filed: Jul. 26, 1990

Related U.S. Application Data

[63] Continuation of Ser. No. 334,214, Apr. 6, 1989, abandoned.

[30] Foreign Application Priority Data

Apr. 11, 1988 [JP] Japan ................................. 63-47709

[51] Int. Cl.⁵ .............................................. G11B 23/04
[52] U.S. Cl. ..................................................... 242/198
[58] Field of Search ............... 242/198, 199, 197, 200; 360/132

[56] References Cited

U.S. PATENT DOCUMENTS 4,447,020  5/1984  Toi et al. ............................. 242/198

Primary Examiner—Stanley N. Gilreath
Attorney, Agent, or Firm—Steinberg & Raskin

[57] ABSTRACT

A magnetic tape cassette capable of highly improving workability and productivity in its manufacturing while ensuring its satisfactory function. The cassette includes a spring for constantly urging each of hub braking levers in a direction of engaging the lever with a reel hub to selectively lock the reel hub. The spring is formed so as to have a substantially straightly extending or flat shape when it is unloaded or in a free state and arranged in a casing in a manner to be constantly kept deflected by cooperation of an urging element and a support element each provided on the hub braking lever and a holding element provided on the casing and constantly abuttedly held at one end thereof on a contact element provided on the hub braking lever.

7 Claims, 2 Drawing Sheets

MAGNETIC TAPE CASSETTE

This is a continuation, of application Ser. No. 334,214, filed Apr. 6, 1989, now abandoned.

BACKGROUND OF THE INVENTION

1. Field of the Invention

This invention relates to a magnetic tape cassette for a video system, an audio system or the like, and more particularly to a magnetic tape cassette including a cover for selectively closing a front portion of a casing to sealedly protect a magnetic tape in non-use.

2. Description of the Prior Art

A magnetic tape cassette used for a video recording and/or reproducing unit, an audio recording and/or reproducing unit or the like often causes dropout of a regenerative signal due to adhesion of fingerprints or dust to a magnetic tape. In order to avoid such a problem, a conventional magnetic tape cassette is so constructed that a front cover closes a front opening of a casing to substantially sealedly receive a magnetic tape in the casing in non-use of the cassette. At this time, it is required to lock tape reels in order to prevent the magnetic tape from being loosened and/or entangled due to reverse rotation of the reels. Also, it is required that the magnetic tape cassette is provided with a lock-releasing mechanism for unlocking the reels to facilitate drawing-out of the magnetic tape from the reels in use of the cassette.

For this purpose, the conventional magnetic tape cassette, as shown in FIG. 1, includes a hub braking lever 100 selectively engaged with a locked portion of each of a pair of reel hubs on which the magnetic tape is wound and which are rotatably received in the casing, to thereby prevent rotation of the reel hub in non-use. The hub braking levers 100 each are constantly urged in a direction of being engaged with the locked portion of the reel hub by a spring 102. Such construction permits the magnetic tape to be sealedly received in the casing by cooperation of the front cover and casing and causes the reel hubs to be locked due to engagement between the hub braking levers and the locked portions of the reel hubs by elastic force of the springs in non-use while ensuring smooth rotation of the reel hubs to permit the magnetic tape to be successfully exposed or drawn out in use or during the recording and reproducing operations.

In the so-constructed conventional magnetic tape cassette, the hub braking levers 100 each include a support portion or element 104 at which the lever 100 is pivotally supported or fitted on a projection or pivot pin 106 provided on an inner surface of the casing. The spring 102 is provided at a central portion thereof with a coiled section 108, which is fitted on the pivot pin 106. Also, the spring 102 is held at both ends thereof on holding elements 110 and 112 provided on the hub brake lever 100 and casing, respectively. Thus, in non-use of the magnetic tape cassette, the spring 102 forces the hub braking lever 100 toward the reel hub to accomplish engagement therebetween to lock the reel hub, whereas in use, the hub braking lever 100 is disengaged from the locked portion of the reel hub against the spring 102 to unlock the reel hub.

Unfortunately, the coiled section of the spring renders manufacturing of the spring highly troublesome and causes much time and labor to be required for the manufacturing. Also, such construction of the spring causes an increase in the amount of a material used for manufacturing the spring and renders incorporation of the spring into the casing highly troublesome. Thus, the conventional magnetic tape cassette is deteriorated in productivity and workability.

Accordingly, it would be highly desirable to develop a magnetic tape cassette which is capable of significantly improving productivity and workability in the manufacturing and reducing the manufacturing cost while ensuring its satisfactory function.

SUMMARY OF THE INVENTION

In accordance with the present invention, a magnetic tape cassette is provided. The magnetic tape cassette includes a casing, in which a pair of reel hubs having a magnetic tape wound thereon are rotatably arranged. The reel hubs each are provided with a locked portion through which the reel hub is selectively locked. The magnetic tape cassette also includes a hub braking lever arranged in the casing so as to be pivotally moved in the casing to be selectively engaged with the locked portion of each of the reel hubs and a spring for constantly urging each of the hub braking levers in a direction of engaging the hub braking lever with the locked portion of the reel hub.

The spring is formed to have a substantially linearly extending shape when it is unloaded or in a free state. The hub braking lever is provided thereon with a support element for supporting an intermediate portion of the spring thereon and an urging element for urgingly holding thereon a portion of the spring located to one side of the intermediate portion of the longitudinal direction thereof. The casing is providing thereon with a holding element for holding the other side of the spring in a latitudinal direction thereon. The urging element, support element and holding element are arranged so as to cooperate together to hold the spring deflected about said support element when the hub braking lever is urged through the urging element. The hub braking lever is provided thereon with a contact element for abuttedly holding the end portion of the spring located to one side of the intermediate portion of the spring, said end portion oriented in a longitudinal direction of the spring to prevent displacement of the spring. The end of the portion of the spring located at the other end of the intermediate portion of the spring, said end portion oriented in a latitudinal direction of the spring, abuttedly contacts the cassette casing such that displacement of the spring is prevented.

Accordingly, it is an object of the present invention to provide a magnetic tape cassette which is capable of highly improving productivity and workability in its manufacturing while ensuring its satisfactory function.

It is another object of the present invention to provide a magnetic tape cassette which is capable of significantly decreasing its manufacturing cost.

It is a further object of the present invention to provide a magnetic tape cassette which is capable of being readily assembled.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Figure 2:
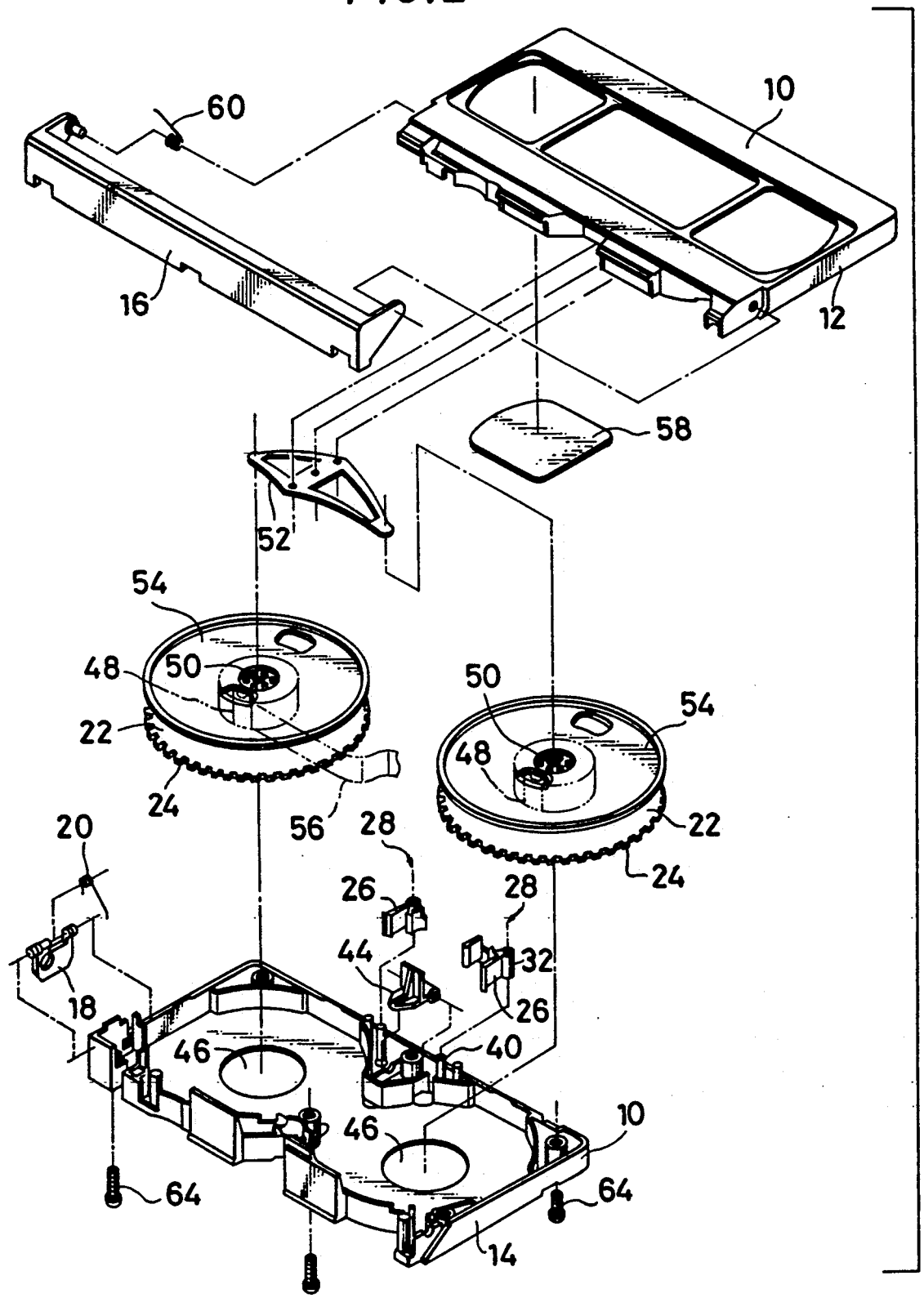
FIG. 2 is an exploded perspective view showing a magnetic tape cassette according to the present invention.

Now a magnetic tape cassette according to the present invention will be described with reference to FIGS. 2 and 3.

A magnetic tape cassette of the illustrated embodiment includes a casing 10 comprising an upper casing member 12 and a lower casing member 14 joined together so as to define a space therebetween. The magnetic tape cassette also includes a front cover 16 adapted to selectively close an opening formed at a front portion of the casing 10. The cover 16 is pivotally mounted on the casing 10 and selectively operated through a locking member 18 provided with a spring 20.

In the space of the casing 10 are rotatably arranged a pair of reel hubs 22 on which a magnetic tape is wound. The reel hubs 22 each are formed on an outer periphery thereof with a locked portion 24. The magnetic tape cassette further includes a pair of hub braking levers 26 each pivotally mounted in the casing 10 corresponding to each of the reel hubs 22 so as to be releasably engaged with the locked portion 24 of each of the reel hubs 22.

Also, the magnetic tape cassette of the illustrated embodiment includes a pair of springs 28 each functioning to constantly urge each of hub braking levers 26 in a direction of causing the lever 26 to be engaged with the locked portion 24 of the reel hub 22.

The springs 28 each are formed so as to have a substantially straightly extending or flat shape when it is unloaded or in a free state. Accordingly, the spring 28 is free of any coiled portion. The spring 28 may be constituted by a leaf spring. Alternatively, it may comprise an elastic rod-like wire. The spring 28 is arranged in the casing 10 in a manner to be normally held deflected. For this purpose, as shown in FIG. 2, the hub braking lever 26 is provided thereon with an urging element 30 for urgingly holding one side portion of the spring 28 in a longitudinal direction thereof and a support element 32 for supporting an intermediate portion of the spring 28 so as to normally hold the spring 28 deflected about the support element and permit the spring 28 to be further deflected about the support element 32 when it is urged through the urging element 30, and the casing 10 is provided on an inner surface thereof with a holding element 34 for holding the other side of the spring 28 in the longitudinal direction of the spring. The urging element 30 and support element 32 may be formed integral with the hub braking lever 26 and the holding element 34 may be formed integral with the casing 10. In the illustrated embodiment, the so-arranged elements 30, 32 and 34 cooperate together to normally keep the spring 28 deflected in a dog-leg shape about the support element 32. Also, the hub braking lever 26 is provided thereon with a contact element 36 for abuttedly holding the end 38a of the portion of the spring 28 located to one side of the intermediate portion of the spring 28, said end portion oriented in a longitudinal direction of the spring to prevent displacement of the spring 28. The cassette casing 10 abuttedly contacts the end 38b of the portion of the spring 28, said end portion oriented in a latitudinal direction of the spring, such that displacement of spring 28 is prevented.

The support element 32 of each of the hub braking levers 26 is pivotally fitted on a pivot pin 40 mounted on the inner surface of the casing 10 in a manner to project therefrom, so that the lever may be pivotally moved about the support element 32. The hub braking lever 26 also includes an operation arm 42 for causing the locked portion 24 of the reel hub 22 to be unlocked or disengaged from the hub braking lever 26. In the illustrated embodiment, the operation arm 42 may be formed into a claw-like shape. Also, in the embodiment, the above-described contact element 36 for abuttedly holding one end 38 of the spring 28 is constituted by a part of the operation arm 42. The other end of the spring 28 is preferably abuttedly held on the casing 10. This may be carried out by means of any holding member arranged on the inner surface of the casing 10.

Figure 3:
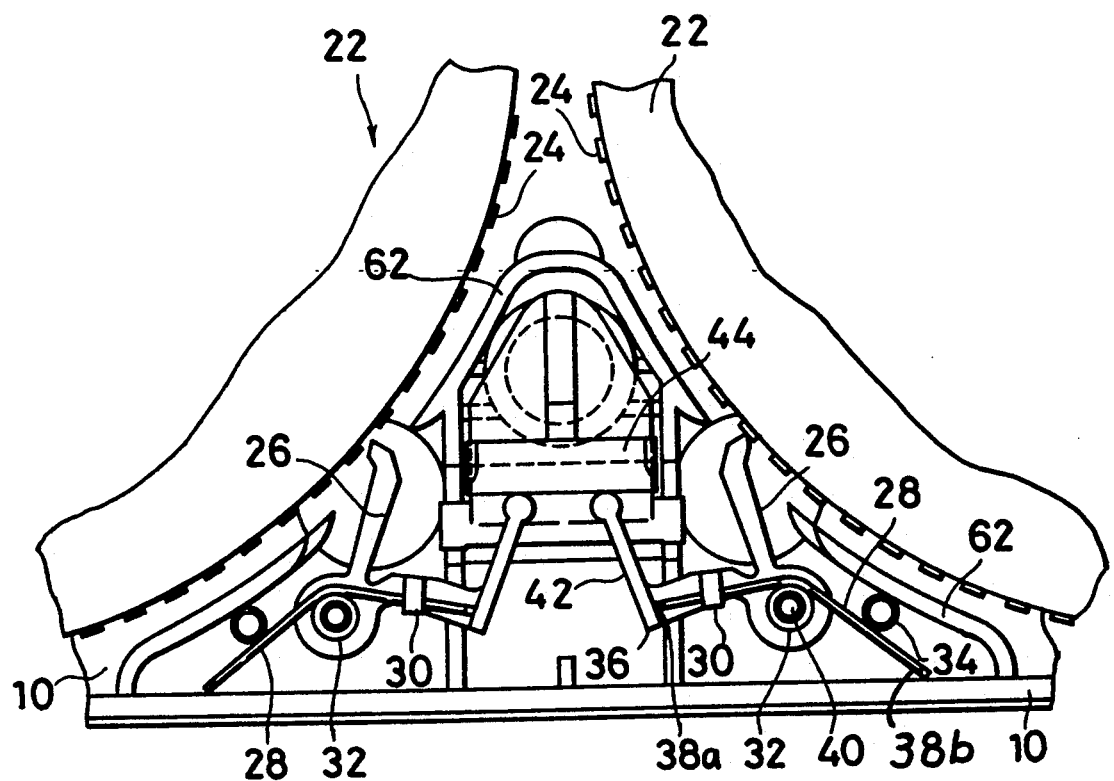
FIG. 3 is a fragmentary plan view showing an essential part of the magnetic tape cassette shown in FIG. 2.

Each of the so-constructed hub braking levers 26 is pivotally moved about the support element 32 fitted on the pivot pin 40 in a direction away from the locked portion 24 of the reel hub 22 or in a counterclockwise direction in FIG. 3 to release it from engagement with the lever 26 when an actuator 44 slidably arranged in the casing 10 in a conventional manner is moved in a downward direction in FIG. 3 to actuate the operation arm 42 against the spring 28. When the actuator 44 is moved in a direction away from the operation arm 42 or an upward direction in FIG. 3, the lever 26 is pivotally moved about the pivot pin 40 in a clockwise direction by the spring 28, so that it may be engaged with the locked portion 24 of the reel hub 22 to lock it.

Reference numeral 46, 48, 50, 52, 54, 56, 58, 60, 62 and 64 designate holes for rotatably fitting reel shafts therein, clamps, reel centers, a reel spring, reel flanges, a magnetic tape, a visual window plate, a spring for the front cover 16, partitions and mounting screws, respectively. These parts may be constructed in a conventional manner.

Figure 1:
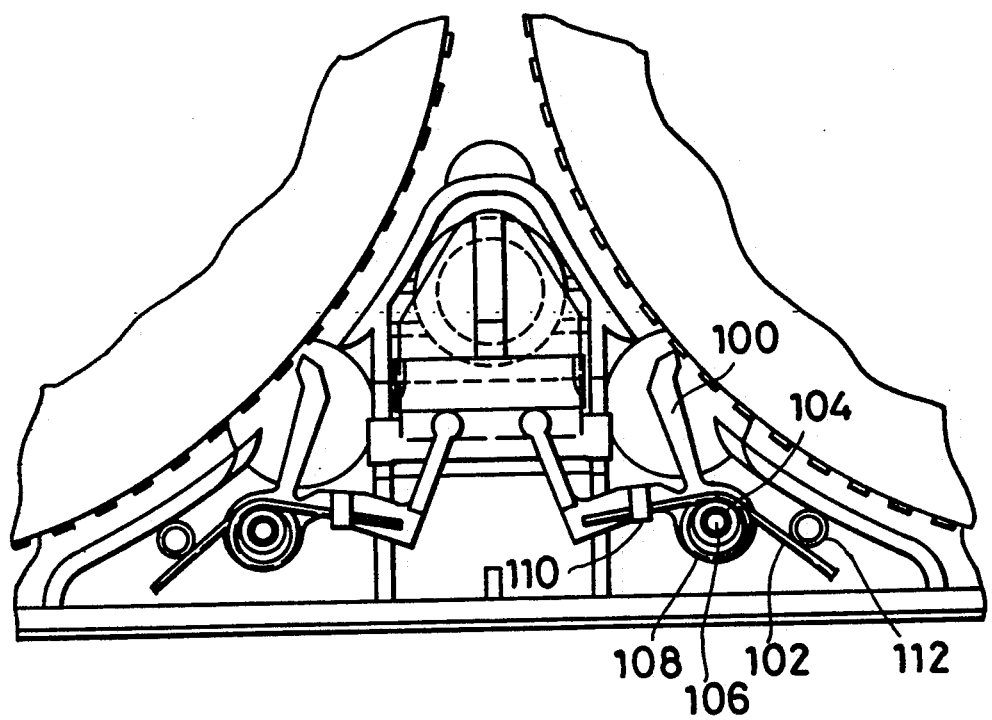
FIG. 1 is a fragmentary plan view showing an essential part of a conventional magnetic tape cassette.

The remaining part of the magnetic tape cassette of the illustrated embodiment may be constructed in substantially the same manner as in the prior art shown in FIG. 1.

Now, the manner of operation of the magnetic tape cassette of the illustrated embodiment may be described hereinafter.

In non-use of the magnetic tape cassette, the front cover 16 closes the casing 10 to sealedly receive the magnetic tape 56 in the casing 10 and each of the hub braking levers 26 is holdingly engaged with the locked portion 24 of the reel hub 22 to lock it, resulting in ensuring safety of the tape. Then, when the magnetic tape cassette is charged in a cassette operating unit such as a cassette deck, release means arranged in the cassette operating unit operates the actuator 44 or slidly moves it in the downward direction in FIG. 3, so that it may gradually force the operation arm 42 against the spring 28. This causes each of the hub braking levers 26 to be pivotally moved about pivot pin 40, the rightmost hub braking lever moves in the counterclockwise direction and the leftmost hub braking lever moves in the clockwise direction, in FIG. 3, so that the lever 26 is released from engagement with the locked portion 24 of the reel hub 22, resulting in the reel hub 22 being unlocked or free to rotate. Concurrently, the front cover 16 is operated to open the front portion of the casing 10, resulting in the magnetic tape 56 being exposed.

Thus, it will be noted that in non-use of the magnetic tape cassette, the spring 28 urges the hub braking lever 26 to engage it with the locked portion 24 of the reel hub 22 to hold the hub 22 locked and the front cover closes the casing 10, thus, the magnetic tape 56 is kept safe.

As can be seen from the foregoing, in the magnetic tape cassette of the present invention, the springs each are formed so as to have a substantially straightly extending or flat shape when it is unloaded or in a free state and arranged in the casing in a manner to be constantly kept deflected by cooperation of the urging element and support element provided on the hub braking lever and the holding element provided on the casing and constantly abuttedly held at one end thereof on the contact element 36 provided on the hub braking lever 26. Such construction highly simplifies manufacturing of the spring and saves a material for the spring, resulting in significant reduction of its manufacturing cost, because the spring is free of any coiled section. Also, it substantially improves workability in manufacturing of the cassette because incorporation of the spring into the casing is easily accomplished. Also, the spring is arranged in the casing in the manner that one end of the spring is abuttedly held on the contact element of the hub braking lever to prevent displacement of the spring. Such arrangement of the spring permits it to be positionally stably held in the casing without any coiled section while permitting it to successfully exhibit its function at least the same level as in the prior art.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A magnetic tape cassette comprising:
    a casing;
    a pair of reel hubs rotatably arranged in said casing and having a magnetic tape wound thereon;
    said reel hubs each being provided with a locked portion through which said reel hub is selectively locked;
    a pair of hub braking levers arranged in said casing so as to be pivotally moved in said casing to be respectively engaged with said locked portion of each of said reel hubs; and each of said reel hubs further comprising;
    a respective spring for impinging on each of said pair of hub braking levers, each respective spring constantly urging said hub braking lever in a direction of engaging said hub braking lever with said locked portion of said reel hub;
    each of said hub braking levers being provided thereon with an urging element for urgingly holding one side portion of said spring in a longitudinal direction thereof and with a support element for supporting an intermediate portion of said spring;
    a pivot element mounted on an inner surface of said casing, said support element being pivotally mounted on said pivot element to project therefrom such that each of said hub braking levers can be pivotally mounted about said pivot element;
    said casing being provided thereon with a holding element for holding the other side of said spring in the longitudinal direction thereon;
    said urging element, support element and holding element being arranged so as to cooperate together to hold said spring deflected in a normal state and cause said spring to be further deflected about said support element when said hub braking lever is urged through said urging element;
    each of said hub braking levers being provided thereon with a contact element for abuttedly holding the end of the portion of the spring located to one side of the intermediate portion of the spring, said portion oriented in a longitudinal direction of the spring, to prevent displacement of said spring;
    and the cassette casing abuttedly contacts the end of the portion of the spring located to the other side of the intermediate portion of the spring, said portion oriented in a latitudinal direction of the spring such that displacement of the spring is prevented.

2. A magnetic tape cassette as defined in claim 1, wherein said urging and support elements are formed integrally with said hub braking lever and said holding element is formed integrally with said casing.

3. A magnetic tape cassette as defined in claim 1, wherein said spring comprises a leaf spring.

4. A magnetic tape cassette as defined in claim 1, wherein said spring comprises a elastic rod-like wire.

5. A magnetic tape cassette as defined in claim 1, wherein each of said hub braking levers include an operation arm externally actuated to pivotally move said hub braking levers, resulting in each of said hub braking levers being released from engagement with said locked portion of said reel hub when said cassette is charged in a cassette operating unit.

6. A magnetic tape cassette as defined in claim 5, wherein said contact element is constituted by a part of said operation arm.

7. A magnetic tape cassette as defined in claim 1, wherein said spring is held into a dog-leg shape when said cassette is in non-use.

* * * * *